Sept. 27, 1949. B. F. KABOSKEY ET AL 2,482,915
REMOVABLE MEAT STORAGE INCREASER
Filed Jan. 14, 1946 3 Sheets-Sheet 3

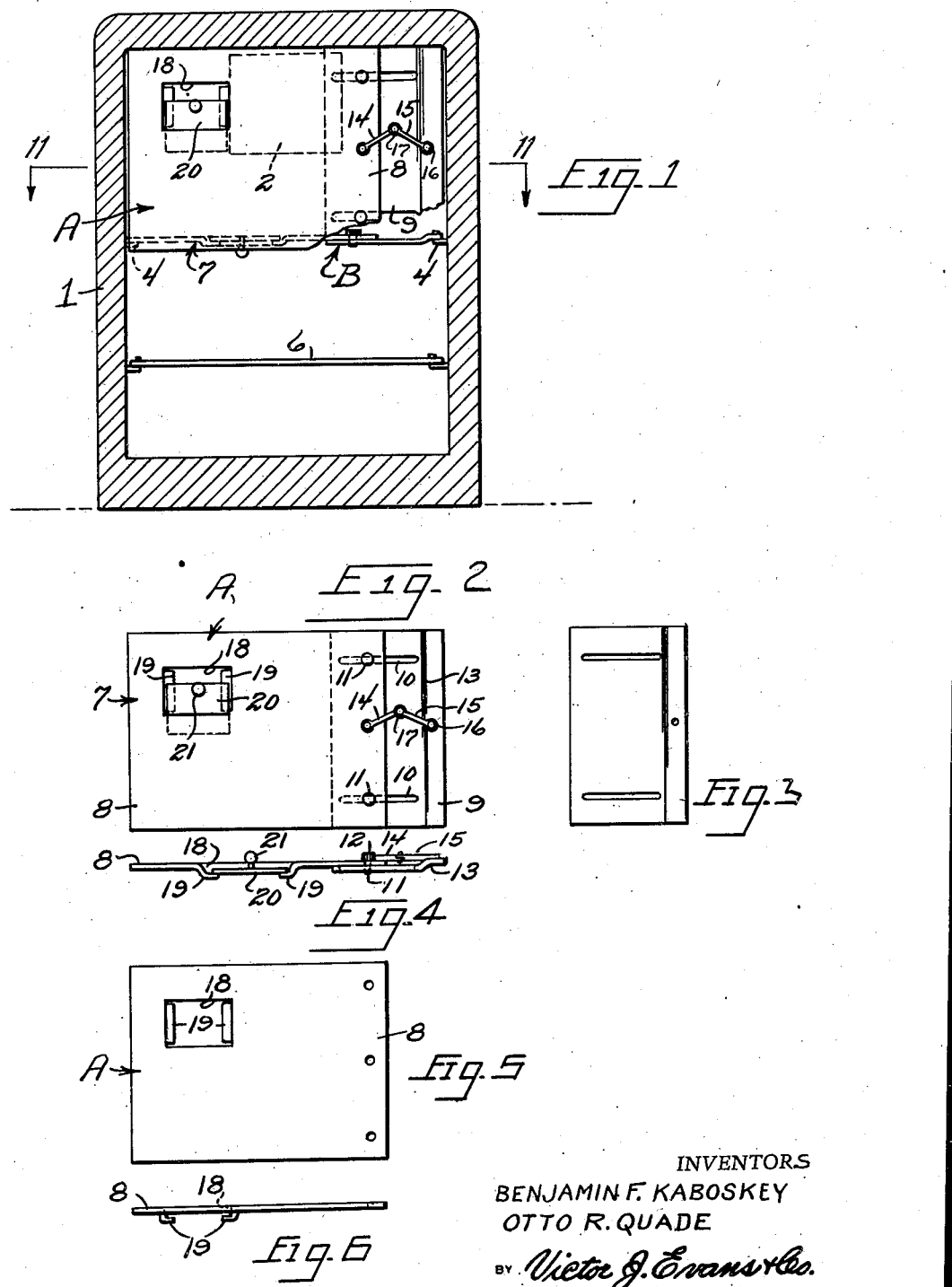

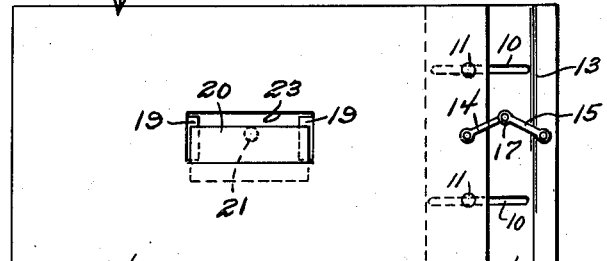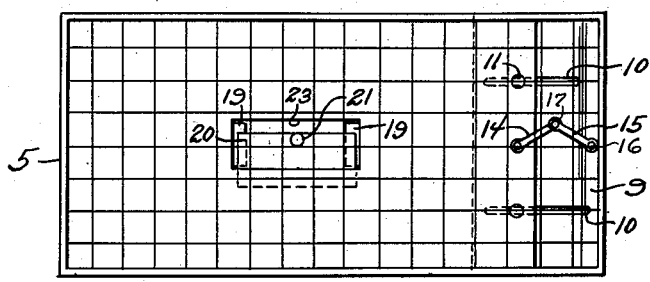

INVENTORS
BENJAMIN F. KABOSKEY
OTTO R. QUADE
BY *Victor J. Evans & Co.*
ATTORNEYS Patented Sept. 27, 1949

2,482,915

UNITED STATES PATENT OFFICE 2,482,915

REMOVABLE MEAT STORAGE INCREASER

Benjamin F. Kaboskey and Otto R. Quade, Milwaukee, Wis.

Application January 14, 1946, Serial No. 641,137

4 Claims. (Cl. 62—89)

Our present invention has to do with removable and adjustable meat storage areas which is adapted for use in old or new refrigerators for freezing meat or the like therein, and more particularly, to an adjustable and removable partitioning arrangement for insertion in the conventional structure of a refrigerator, and adjustable ventilating means whereby a part of the refrigerator may be adapted for deep freezing and supplemented with suitable ventilation equipment. Our invention is simple, sturdy and practical and can be applied to any conventional refrigerator, and can be removed at any time so that the refrigerator can be again used in the normal manner.

Other and equally important objects and advantages will be apparent from the following description and drawings, and changes in form, size, shape, materials, and construction and arrangement of parts are permissible and within the purview of my broad inventive concept, and the scope of the appended claims.

In the drawings, wherein we have illustrated a preferred form of our invention—

Figure 1 is a vertical sectional view of a refrigerator to which my invention is applied;

Figure 2 is a plan view of one panel or partition member with adjustable extension;

Figure 3 is a plan view of the extension.

Figure 4 is an edge view of one panel or partition member with adjustable extension.

Figure 5 is a plan view of the horizontal panel or partition member with the adjustable extension and ventilation door or slide removed;

Figure 6 is an edge view of the horizontal panel or partition member with the adjustable extension and ventilation door or slide removed.

Figure 7 shows a plan view of the adjustable and removable panel;

Figure 8 is an edge view of the adjustable and removable panel.

Figure 9 is a view similar to Figure 7 showing a shelf in association with the device;

Figure 10 is a view similar to Figure 8 showing a shelf in association with the device;

Figure 11:
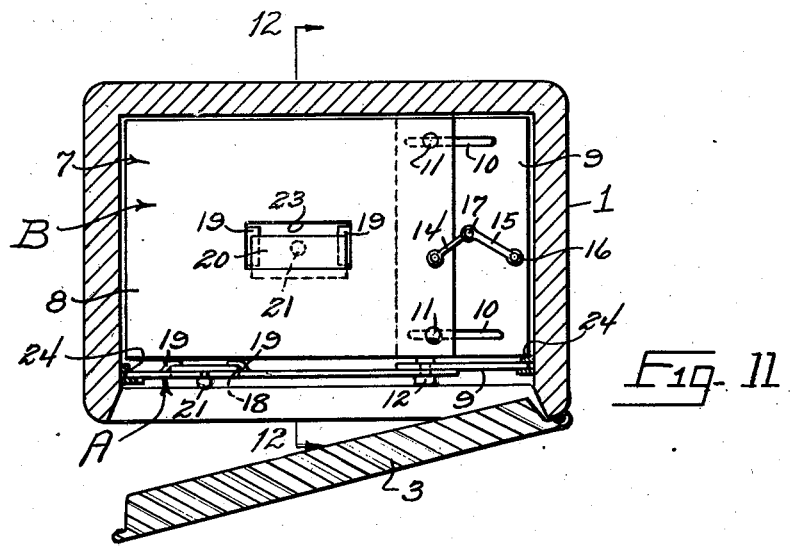
Figure 11 is a sectional view taken on the line 11—11 of Figure 1 of my device applied to a refrigerator.
Figure 12:
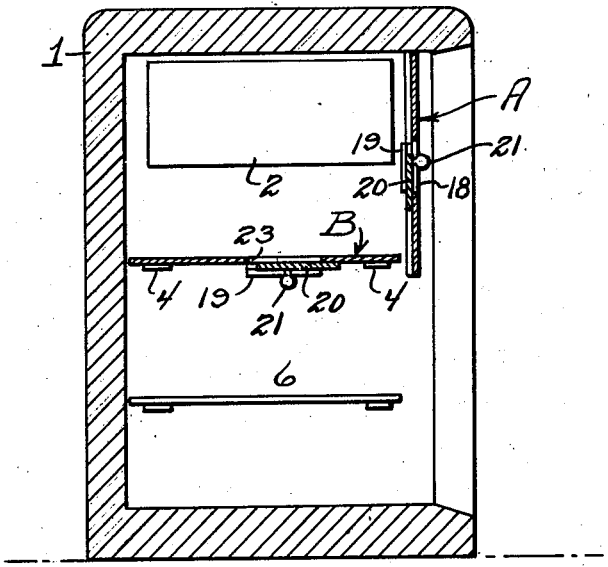
Figure 12 is a section on the line 12—12 of Figure 11.

In the drawings, wherein we have illustrated a preferred form of our invention—

The numeral 1 designates the body of a conventional refrigerator, 2 is the evaporator, 3 the hinged door, 4 the shelving slides or brackets, and 5 one of the wire net shelves. The refrigerator may be of any desired size, shape or type. In applying our device, the usual top storage shelf 6 is usually removed, and the shelving slides or brackets 4 effect proper support for our device.

The device constituting the invention comprises a pair of sections or panels, A and B, respectively, and that panel specifically referred to at 7 has an elongated rectangular body portion 8 and an adjustable leaf or extension 9 of the same width as the body portion and slidably mounted underneath the end thereof. The leaf or extension 9 has elongated slots 10 through which extend adjusting bolts 11 carried by the body portion, and having knurled nuts 12 to facilitate operation of the same. The leaf or extension has its outer end bent up and aligned with the body part, as at 13. A pair of break jointed links 14 and 15, one pivoted to the end of the body and the other to the end 13 of the leaf or extension, as at 16, and are pivoted together at their ends, as at 17 to support and limit the outer movement of the leaf or extension with respect to the body. A rectangular ventilating opening 18 is formed at the upper left hand corner of the body and downwardly and inwardly bent track flanges 19 extend from its end edges to slidably support a closure 20 having an operating knob 21. In applying the section A alone, the end leaf or extension is adjusted to the width of the refrigerator to which our device is applied and the bolts 11 tightened up so that such device is firmly supported on the ledges or brackets 4. As shown in Figure 1, the storage shelf 6 is lowermost to the device. In order to complete our freezing storage compartment, we provide the bottom panel B in all respects the same in construction as the top panel A, except that the ventilating opening 23 is located centrally thereof. When the panels are used in conjunction with each other, the U-shaped channels 24 provided at the sides of the refrigerator, have closed lower ends which support the panel A at the lower outer edges thereof as shown in Figure 11. Thus the panels A and B provide a fully enclosed compartment which is ventilated through openings 18 and 23. Our panels may be removed at any time to use the refrigerator in the usual manner.

Now, by the installation of assembly constituting the present invention, in the upper portion of a refrigerator the temperature of this created compartment can be lowered to a sub freezing temperature by the use of the thermostat within such refrigerator. This compartment can be used for meats, etc., that need a much lower temperature for keeping fresh. At the same time, without tampering with the thermostat, the temperature in the lower part of the refrigerator can be maintained above freezing for the storing of vegetables, etc. This temperature being regulated by the use of the ventilators before mentioned. Thus it should be apparent that within the upper portion of the refrigerator the space provided can have a temperature of that below freezing, and at the same time the lower portion of the said refrigerator can have a temperature above freezing.

From the foregoing, it is believed that the operation and advantages of our invention will be apparent, but it is again pointed out that interpretation of the scope of our invention should only be conclusive when made in the light of the subjoined claims.

We claim:

1. A removable storage compartment forming device for use with a refrigerator having a freezing unit incorporated therein, comprising a horizontally disposed base panel supported in said refrigerator below said freezing unit in spaced relation thereto, a vertically disposed front panel supported in said refrigerator in front of said freezing unit between said unit and the door opening of said refrigerator, both located and conforming to the uppermost portion of the refrigerator, each of said panels having a body portion formed with ventilating openings, adjustable extensions on said panels break jointed links connecting said extensions to said panels, means for retaining said extensions and said panels in fixed relation to each other and adjustable closures for each said ventilating opening.

2. A removable storage compartment forming device for use with refrigerators having a freezing unit incorporated therein, comprising an elongated horizontally disposed bottom panel and an adjustable vertically disposed front panel said panels adapted to be disposed below and at the front of said freezing unit respectively, each of said panels having a body part formed with a ventilating opening, an adjustable extension on each of said panels and having elongated slots, bolts carried by the bodies and extending through the slots to hold the extensions in adjusted position, pivotally connected arms, the ends of which are pivotally connected respectively to the panel bodies and the extensions for supporting and limiting the movement of the extensions, and slidable closures for said ventilating openings.

3. The invention as defined in claim 1 wherein the adjustable extension is slidably related to the under sides of the body, and have upwardly bent edge parts aligned with the bodies, and the ventilating opening of the horizontal panel located centrally of the body, and of the front panel at the upper left hand corner of the body.

4. The combination with a refrigerator having storage shelves and supporting brackets therefore, of compartment panels, one designed to take the place of a top storage shelf and to rest on its supporting bracket, and the other panel extending from said first panel to the top of the refrigerator, said panels provided with cooperating ventilating openings, an adjustable and slidable end extension, on each panel, means for holding said panels in adjusted position, and means for supporting and limiting the movement of said extensions.

BENJAMIN F. KABOSKEY.
OTTO R. QUADE.

REFERENCES CITED

The following references are of record in the file of this patent:

UNITED STATES PATENTS

| Number | Name | Date |
|---|---|---|
| 1,244,351 | Luckenbaugh | Oct. 23, 1917 |
| 2,222,201 | Ito | Nov. 19, 1940 |
| 2,304,465 | Maniscalco | Dec. 8, 1942 |

FOREIGN PATENTS

| Number | Country | Date |
|---|---|---|
| 404,419 | Great Britain | Jan. 18, 1934 |